(12) United States Patent
Hartranft et al.

(10) Patent No.: US 9,388,885 B2
(45) Date of Patent: Jul. 12, 2016

(54) MULTI-TOOL TRANSMISSION AND ATTACHMENTS FOR ROTARY TOOL

(71) Applicant: IDEAL INDUSTRIES, INC., Sycamore, IL (US)

(72) Inventors: Bruce Hartranft, St. Charles, IL (US); Raymond R. Ferriss, Marengo, IL (US); Michael Weiby, Bartlett, IL (US); Ian Rittof, Waterman, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 641 days.

(21) Appl. No.: 13/836,930

(22) Filed: Mar. 15, 2013

(65) Prior Publication Data

US 2014/0260720 A1    Sep. 18, 2014

(51) Int. Cl.
| | |
|---|---|
| *F16H 21/22* | (2006.01) |
| *B25F 5/00* | (2006.01) |
| *B25F 3/00* | (2006.01) |
| *F16H 1/16* | (2006.01) |

(52) U.S. Cl.
CPC *F16H 21/22* (2013.01); *B25F 3/00* (2013.01); *B25F 5/001* (2013.01); *F16H 1/16* (2013.01); *Y10T 74/18056* (2015.01); *Y10T 74/18184* (2015.01)

(58) Field of Classification Search
CPC ....... F16H 21/22; B23Q 9/0042; B23D 49/16
USPC ........... 173/47, 213, 216, 217; 30/388; 74/42, 74/25
See application file for complete search history.

(56) References Cited

U.S. PATENT DOCUMENTS

| | | | |
|---|---|---|---|
| 2,746,327 | A | 5/1956 | Runde |
| 2,828,538 | A | 4/1958 | Darden |
| 3,332,272 | A | 7/1967 | Tonchen |
| 3,466,920 | A | 9/1969 | Parker |
| 3,688,553 | A | 9/1972 | Demler, Sr. |
| 3,731,518 | A | 5/1973 | Blocher |
| 3,817,079 | A | 6/1974 | Priester |
| 3,888,102 | A | 6/1975 | Nigido |
| 3,892,148 | A | 7/1975 | Wiley |
| 4,034,591 | A | 7/1977 | Rothenberger |
| 4,043,164 | A | 8/1977 | Brookman |
| 4,043,171 | A | 8/1977 | Brookman |
| 4,084,317 | A | 4/1978 | Nakamura et al. |

(Continued)

OTHER PUBLICATIONS

ISA/US, International Search Report and Written Opinion issued on PCT Application No. IB2014/059822, received Jul. 14, 2014, 8 pages.

*Primary Examiner* — Nathaniel Chukwurah
(74) *Attorney, Agent, or Firm* — Greenberg Traurig, LLP

(57) ABSTRACT

An embodiment of the present invention is directed to a drive mechanism for translating rotational output from a moveable member of a rotary tool to an interchangeable attachment having a movable member. The drive mechanism includes a rotatable drive shaft sized and shaped for insertion into the rotary member of the rotary tool, a connector adapted to selectively secure the drive mechanism to the interchangeable attachment, a reciprocating drive member adapted to contact the movable member of the interchangeable attachment and to cause the movable member to move, when the interchangeable attachment is secured to the drive mechanism, and a transmission configured to translate rotation of the drive shaft into reciprocating motion of the drive member.

18 Claims, 10 Drawing Sheets

(56) References Cited

U.S. PATENT DOCUMENTS

| | | | |
|---|---|---|---|
| 4,094,064 A | 6/1978 | Nishikawa et al. | |
| 4,107,249 A | 8/1978 | Murai et al. | |
| 4,109,504 A | 8/1978 | Rommel | |
| 4,144,737 A | 3/1979 | Izraeli | |
| 4,154,083 A | 5/1979 | Rothenberger | |
| 4,155,242 A | 5/1979 | Peterson | |
| 4,158,302 A | 6/1979 | O'Loughlin | |
| 4,170,154 A | 10/1979 | Izraeli | |
| 4,176,450 A | 12/1979 | Muromoto | |
| 4,186,484 A | 2/1980 | Tanaka | |
| 4,198,844 A | 4/1980 | Lowe et al. | |
| 4,250,607 A | 2/1981 | Lillbacka et al. | |
| 4,262,518 A | 4/1981 | Creger et al. | |
| 4,292,833 A | 10/1981 | Lapp | |
| 4,306,442 A | 12/1981 | Schrock | |
| 4,308,736 A | 1/1982 | Lowe et al. | |
| 4,312,127 A | 1/1982 | Tanaka | |
| 4,330,924 A | 5/1982 | Kushner et al. | |
| 4,336,652 A | 6/1982 | Robertson | |
| 4,368,577 A | 1/1983 | Babb | |
| 4,385,514 A | 5/1983 | Sassak | |
| 4,412,380 A | 11/1983 | Kish | |
| 4,425,783 A | 1/1984 | Rast | |
| 4,426,761 A | 1/1984 | Sassak | |
| 4,434,555 A | 3/1984 | Stoll | |
| 4,445,358 A | 5/1984 | Gooding | |
| 4,464,917 A | 8/1984 | Kienhofer | |
| 4,480,460 A | 11/1984 | Bush et al. | |
| 4,494,398 A | 1/1985 | Svoboda | |
| 4,527,414 A | 7/1985 | Jurkovic et al. | |
| 4,528,740 A | 7/1985 | Sassak | |
| 4,558,584 A | 12/1985 | Myers | |
| 4,604,890 A | 8/1986 | Martin | |
| 4,667,502 A | 5/1987 | Bush et al. | |
| 4,674,184 A | 6/1987 | Anderson | |
| 4,700,592 A | 10/1987 | Rommel | |
| 4,735,078 A | 4/1988 | Wesebaum | |
| 4,739,554 A | 4/1988 | Hytonen | |
| 4,785,538 A | 11/1988 | Meyer | |
| 4,790,068 A | 12/1988 | Sato | |
| 4,796,461 A | 1/1989 | Mead | |
| 4,829,805 A | 5/1989 | Koehn | |
| 4,888,975 A | 12/1989 | Soward | |
| 4,890,472 A | 1/1990 | Rothenberger | |
| 4,926,685 A | 5/1990 | Shannon, Sr. | |
| 4,932,237 A | 6/1990 | Hatfield | |
| 4,934,038 A | 6/1990 | Caudill | |
| 4,934,172 A | 6/1990 | Bush et al. | |
| 4,949,463 A * | 8/1990 | Chen | B23D 49/162 144/136.1 |
| 4,956,992 A | 9/1990 | Undin | |
| 4,987,763 A | 1/1991 | Kistner et al. | |
| 4,989,443 A | 2/1991 | Sawdon | |
| 5,012,579 A | 5/1991 | Matsumoto | |
| 5,022,254 A | 6/1991 | Kramer | |
| 5,025,546 A | 6/1991 | Gotch et al. | |
| 5,033,301 A | 7/1991 | Kistner et al. | |
| 5,046,250 A | 9/1991 | Huang | |
| 5,046,349 A | 9/1991 | Velte | |
| 5,062,290 A | 11/1991 | Hoover | |
| 5,063,770 A | 11/1991 | Chen | |
| 5,070,616 A | 12/1991 | Chen | |
| 5,088,196 A | 2/1992 | Fukuda | |
| 5,090,230 A | 2/1992 | Koskinen | |
| 5,099,577 A | 3/1992 | Hutt | |
| 5,103,699 A | 4/1992 | Brown | |
| 5,111,681 A | 5/1992 | Yasui et al. | |
| 5,113,727 A | 5/1992 | Foster | |
| 5,121,625 A | 6/1992 | Unewisse et al. | |
| 5,125,296 A | 6/1992 | Nelson et al. | |
| 5,125,324 A * | 6/1992 | Araki | B25B 27/10 269/238 |
| 5,129,158 A | 7/1992 | Campagna | |
| 5,138,863 A | 8/1992 | Kistner et al. | |
| 5,138,864 A | 8/1992 | Tarpill | |
| 5,148,698 A | 9/1992 | Dischler | |
| 5,152,162 A | 10/1992 | Ferraro et al. | |
| 5,152,713 A | 10/1992 | Baertlein | |
| 5,153,984 A | 10/1992 | Beetz et al. | |
| 5,161,439 A | 11/1992 | Wesch, Jr. | |
| 5,193,379 A | 3/1993 | Ferraro | |
| 5,195,353 A | 3/1993 | Erbrick et al. | |
| 5,195,354 A | 3/1993 | Yasui et al. | |
| 5,243,845 A | 9/1993 | Velte | |
| 5,243,846 A | 9/1993 | Davis et al. | |
| 5,253,554 A | 10/1993 | Riera et al. | |
| 5,257,525 A | 11/1993 | Clarke | |
| 5,267,464 A | 12/1993 | Cleland | |
| 5,289,712 A | 3/1994 | Haughian | |
| 5,291,772 A | 3/1994 | Ferraro | |
| 5,307,565 A | 5/1994 | Erbrick et al. | |
| 5,307,664 A | 5/1994 | Homm | |
| 5,309,751 A | 5/1994 | Ryan | |
| 5,335,531 A | 8/1994 | Mann et al. | |
| 5,353,623 A | 10/1994 | Bobenhausen | |
| 5,373,639 A | 12/1994 | Huang | |
| 5,377,400 A | 1/1995 | Homm | |
| 5,421,186 A | 6/1995 | Lefavour | |
| 5,425,262 A | 6/1995 | Dubugnon | |
| 5,487,297 A | 1/1996 | Ryan et al. | |
| 5,490,406 A | 2/1996 | College | |
| 5,544,418 A * | 8/1996 | Harada | A01G 3/08 30/210 |
| 5,553,478 A | 9/1996 | Di Troia | |
| 5,566,768 A * | 10/1996 | Bourke | B23D 49/162 144/48.6 |
| 5,611,228 A | 3/1997 | Dummermuth | |
| 5,611,236 A | 3/1997 | Grunwald | |
| 5,666,711 A | 9/1997 | Pfeiffer | |
| 5,697,135 A | 12/1997 | Dischler | |
| 5,718,051 A | 2/1998 | Huang | |
| 5,727,417 A | 3/1998 | Moffatt et al. | |
| 5,743,131 A | 4/1998 | Holliday et al. | |
| 5,744,085 A * | 4/1998 | Sorberg | B21D 39/20 264/296 |
| 5,806,362 A | 9/1998 | Dubugnon | |
| 5,819,605 A | 10/1998 | Buck et al. | |
| 5,839,316 A | 11/1998 | Kolivoski et al. | |
| 5,862,593 A | 1/1999 | Huang | |
| 5,907,906 A | 6/1999 | Sweeney | |
| 5,924,201 A | 7/1999 | Wang | |
| 5,934,136 A | 8/1999 | Bracher et al. | |
| 5,987,750 A | 11/1999 | Tally | |
| 6,014,810 A | 1/2000 | Earle et al. | |
| 6,035,775 A | 3/2000 | Nghiem | |
| 6,044,681 A | 4/2000 | Franken | |
| 6,044,686 A | 4/2000 | Dischler | |
| 6,058,755 A | 5/2000 | Viegener | |
| 6,098,291 A | 8/2000 | Wang | |
| 6,101,862 A | 8/2000 | Rzasa et al. | |
| 6,116,118 A | 9/2000 | Wesch, Jr. | |
| 6,138,346 A | 10/2000 | Shutts et al. | |
| 6,154,964 A | 12/2000 | Tally | |
| 6,161,416 A | 12/2000 | Wilhelm et al. | |
| 6,164,106 A | 12/2000 | Nghiem et al. | |
| 6,202,290 B1 | 3/2001 | Kewitz et al. | |
| 6,220,074 B1 | 4/2001 | Montminy et al. | |
| 6,227,030 B1 | 5/2001 | Lefavour et al. | |
| 6,240,626 B1 | 6/2001 | Nghiem | |
| 6,244,085 B1 | 6/2001 | Dummermuth | |
| 6,269,675 B1 | 8/2001 | Burnett | |
| 6,286,358 B1 | 9/2001 | Beetz et al. | |
| 6,378,194 B1 | 4/2002 | Nghiem | |
| 6,401,515 B2 | 6/2002 | Frenken | |
| 6,405,411 B1 | 6/2002 | Allemann et al. | |
| 6,415,641 B1 | 7/2002 | Wagner | |
| 6,434,998 B2 | 8/2002 | Amherd | |
| 6,457,338 B1 | 10/2002 | Frenken | |
| 6,474,130 B2 | 11/2002 | Battenfeld | |
| 6,477,757 B2 | 11/2002 | Viegener | |
| 6,487,776 B2 | 12/2002 | Chang | |
| 6,510,719 B2 | 1/2003 | Goop | |
| 6,510,723 B2 | 1/2003 | Amherd | |
| 6,513,245 B1 | 2/2003 | Aubriot | |

(56) References Cited

U.S. PATENT DOCUMENTS

| | | |
|---|---|---|
| 6,553,670 B2 | 4/2003 | Chang |
| 6,612,147 B2 | 9/2003 | Beetz et al. |
| 6,619,101 B1 | 9/2003 | Faucher et al. |
| 6,658,738 B1 | 12/2003 | King |
| 6,658,739 B1 | 12/2003 | Huang |
| 6,666,064 B2 | 12/2003 | LeFavour et al. |
| 6,668,613 B2 | 12/2003 | Lefavour et al. |
| 6,672,128 B2 | 1/2004 | Wagner et al. |
| 6,694,586 B1 | 2/2004 | Goop |
| 6,729,009 B2 | 5/2004 | Goop |
| 6,739,172 B2 | 5/2004 | Wagner |
| 6,745,611 B2 | 6/2004 | Lefavour et al. |
| 6,769,283 B2 | 8/2004 | Suresh |
| 6,772,618 B2 | 8/2004 | Frenken |
| 6,792,789 B1 | 9/2004 | Faucher |
| 6,862,766 B2 | 3/2005 | Geurts |
| 7,000,448 B2 | 2/2006 | Hamm et al. |
| 7,036,806 B2 | 5/2006 | Amherd et al. |
| 7,111,488 B2 | 9/2006 | Lefavour et al. |
| 7,124,608 B2 | 10/2006 | Goop |
| 7,127,819 B1 | 10/2006 | Huang |
| 7,128,560 B2 | 10/2006 | Tandart |
| 7,146,839 B2 | 12/2006 | Goop |
| 7,155,955 B2 | 1/2007 | Bowles et al. |
| 7,237,427 B2 | 7/2007 | Viegener |
| 7,254,982 B2 | 8/2007 | Frenken |
| 7,293,362 B2 * | 11/2007 | Konen ................ B23D 29/002  30/228 |
| 7,299,674 B2 | 11/2007 | Palejwala et al. |
| 7,325,436 B2 | 2/2008 | Cheng |
| 7,328,513 B1 | 2/2008 | Yang |
| 7,340,936 B2 | 3/2008 | Gregg |
| 7,363,799 B2 | 4/2008 | Hamm et al. |
| 7,412,868 B2 | 8/2008 | Frenken |
| 7,421,871 B2 | 9/2008 | Goop |
| 7,421,877 B2 | 9/2008 | Frenken |
| 7,434,440 B2 | 10/2008 | Fay |
| 7,434,441 B2 | 10/2008 | Frenken |
| 7,464,578 B2 | 12/2008 | Ayer et al. |
| 7,503,201 B2 | 3/2009 | Cleland et al. |
| 7,578,159 B2 | 8/2009 | Bowles et al. |
| 7,628,052 B2 | 12/2009 | Zhang |
| 7,716,840 B2 | 5/2010 | Nandkumar et al. |
| 7,743,509 B2 | 6/2010 | Macsay et al. |
| 7,765,850 B2 | 8/2010 | Arita et al. |
| 7,823,433 B2 | 11/2010 | Zhang |
| 7,886,446 B2 | 2/2011 | Yu Chen |
| 7,886,570 B2 | 2/2011 | Cleland et al. |
| 7,908,741 B2 | 3/2011 | Chawgo |
| 7,922,475 B2 | 4/2011 | Gueit |
| 7,950,421 B2 | 5/2011 | Nakagawa et al. |
| 7,954,356 B1 | 6/2011 | Erbrick et al. |
| 7,979,980 B2 | 7/2011 | Westley et al. |
| 8,024,864 B2 | 9/2011 | Mortensen |
| 8,151,618 B2 | 4/2012 | Polofsky |
| 8,198,839 B2 | 6/2012 | Katou et al. |
| 2002/0056558 A1 | 5/2002 | Bongers-Ambrosius |
| 2011/0239425 A1 | 10/2011 | Thorson et al. |
| 2012/0125074 A1 | 5/2012 | Zhang |
| 2013/0228355 A1 | 9/2013 | Kuehne et al. |
| 2013/0264085 A1 | 10/2013 | Ciotti |

* cited by examiner

MULTI-TOOL TRANSMISSION AND ATTACHMENTS FOR ROTARY TOOL

BACKGROUND

Various forms of hand-powered, single-purpose tools are known for working with cross-linked polyethylene (PEX) tubing, metal tubing and the like, including cutters, crimpers and expanders. However, such hand tools are not well-suited to tasks requiring their repeated use.

On the other hand, electrically powered, single purpose tools are also known that perform these same functions. However, such power tools are quite expensive—often costing in excess of $300. Moreover, because these tools are single-purpose, it is often necessary for a worker to carry one of each type of tool (e.g. a power cutter, a power crimper and a power expander), thereby compounding the expense.

Applicants are also aware of a sheet metal cutter manufactured by Malco Products, Inc., which attaches to power drill and utilizes the rotation of the drill chuck to create a reciprocating motion of a pair of shears. Again, however, the aforementioned device is single-purpose, thereby necessitating a separate tool for each task.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, a drive mechanism for translating rotational output from a rotary tool to an interchangeable attachment having a movable member. The drive mechanism includes a rotatable drive shaft sized and shaped for insertion into rotating member of the rotary tool, a connector adapted to selectively secure the drive mechanism to the interchangeable attachment, a reciprocating drive member adapted to contact the movable member of the interchangeable attachment and to cause the movable member to move, when the interchangeable attachment is secured to the drive mechanism, and a transmission configured to translate rotation of the drive shaft into reciprocating motion of the drive member.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, and components have not been described in detail as not to unnecessarily obscure aspects of the present invention.

Generally speaking, various embodiments of the present invention provide for an interchangeable system that utilizes a conventional rotary tool—such as an electric, hydraulic or pneumatic drill, rotary sander or the like—to power a variety of devices, including but not limited to tubing cutters, crimpers and expanders. This is achieved by mounting to the rotary tool a multi-purpose transmission, to which a variety of interchangeable attachments for performing a variety of functions may be attached.

Figure 1:
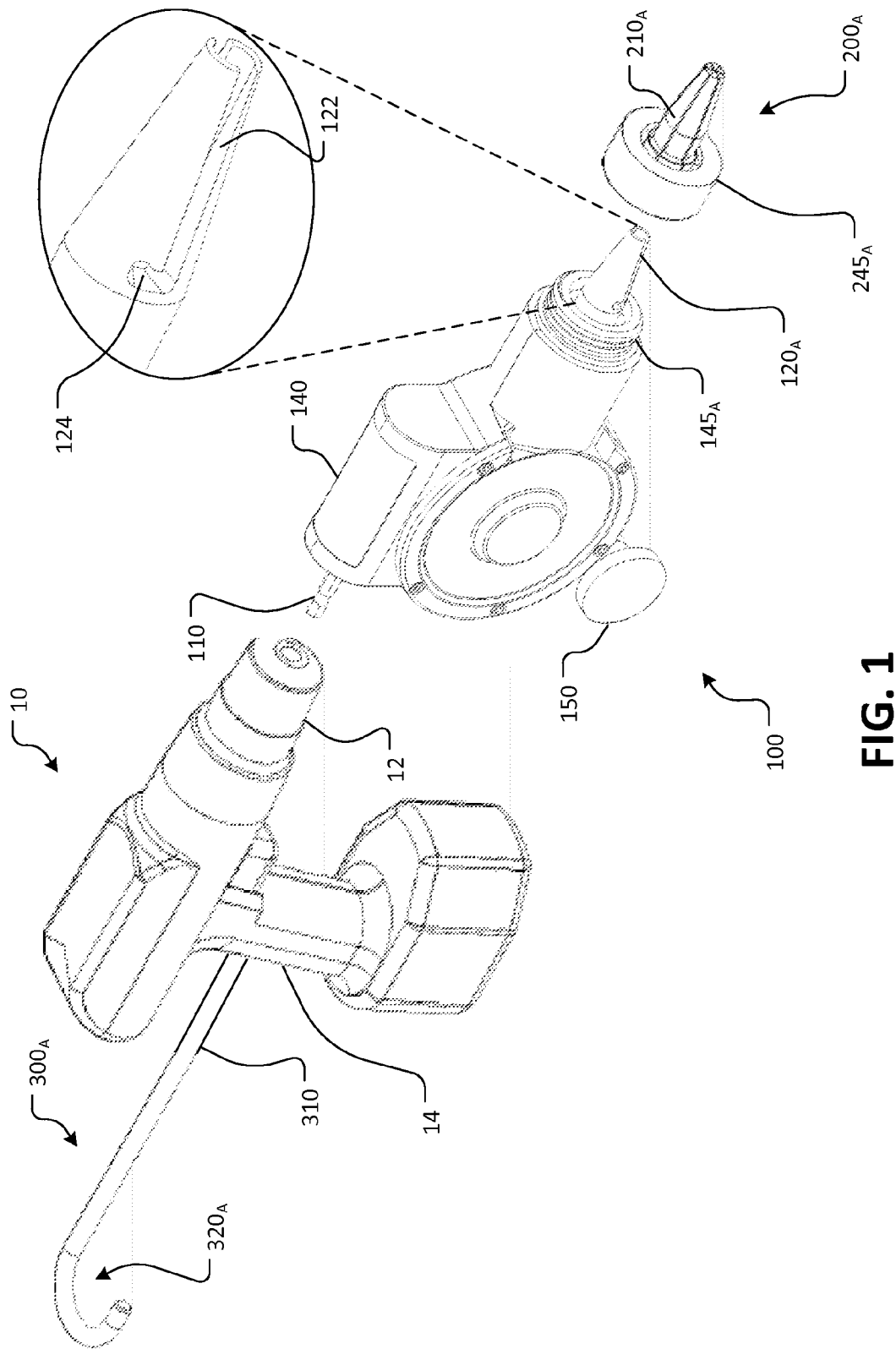
FIG. 1 is an exploded view of a system for translating rotational output from a chuck of a power drill, in accordance with various embodiments of the present invention.
Figure 2:
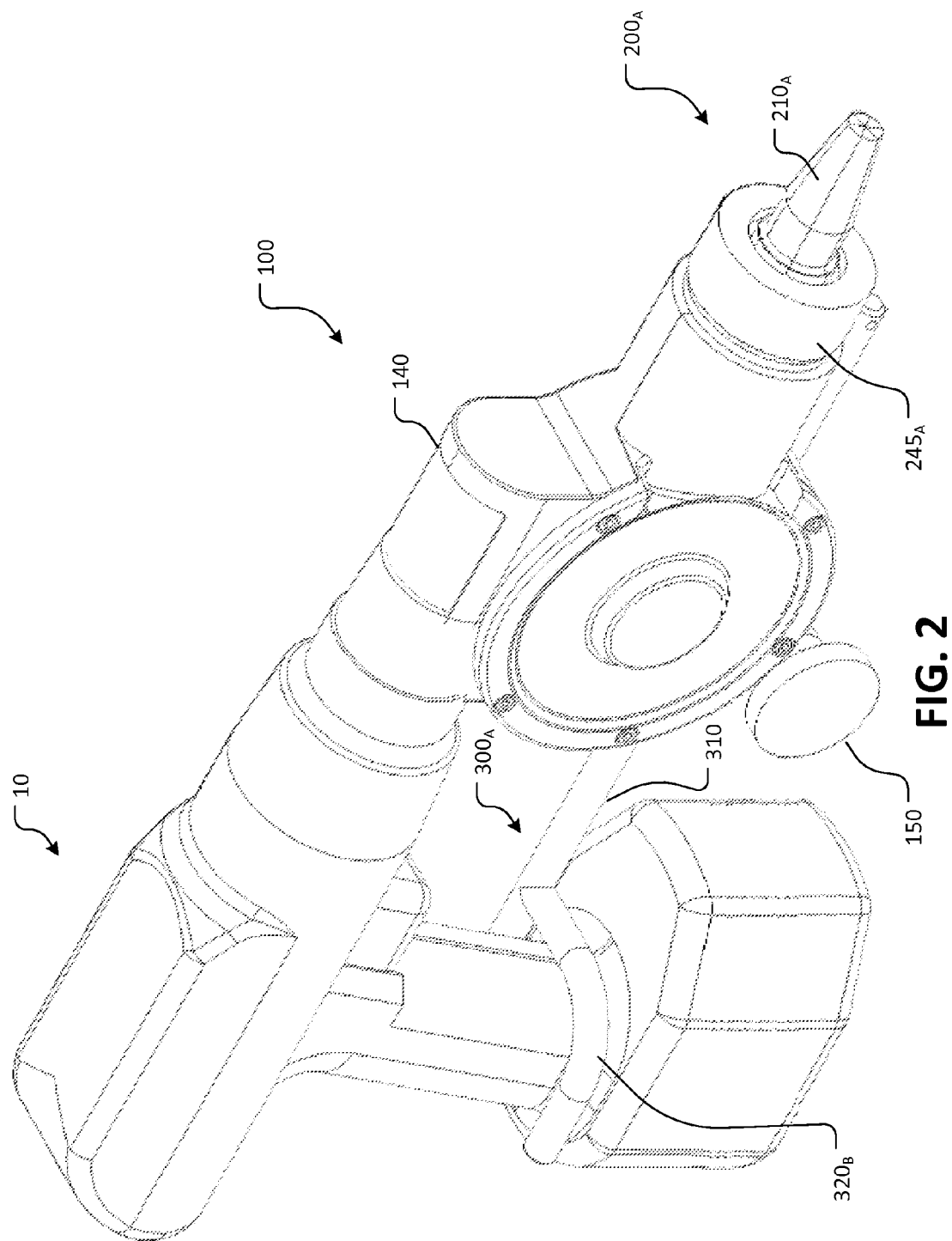
FIG. 2 is a perspective view of a system for translating rotational output from a chuck of a power drill, in accordance with various embodiments of the present invention.
Figure 15:
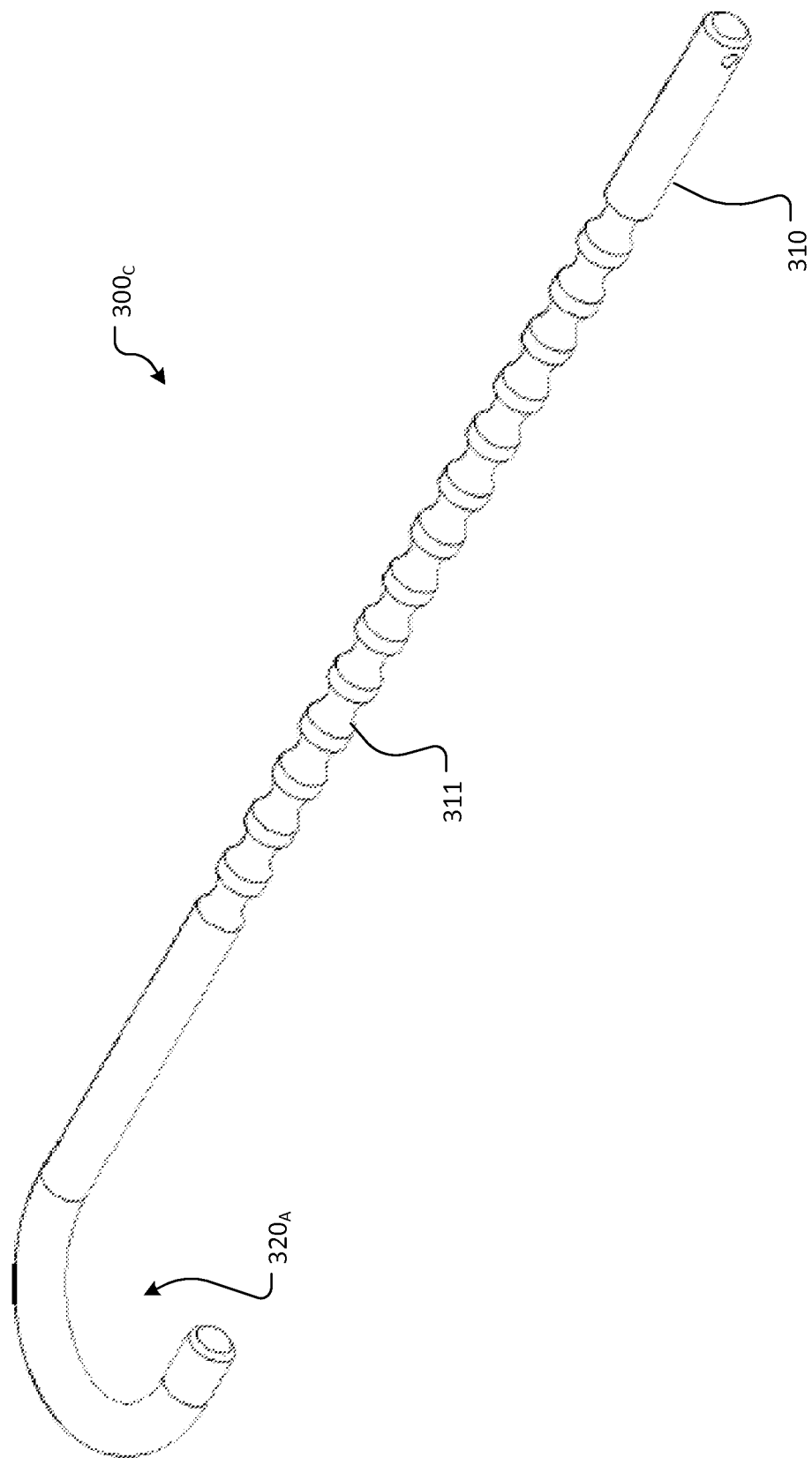
FIG. 15 illustrates a ribbed torsion bar, in accordance with an embodiment of the present invention.

FIGS. 1 and 2 show exploded and assembled views, respectively, of systems for translating rotational output from a chuck 12 of a power drill 10, in accordance with various embodiments of the present invention. The illustrated system includes a drive mechanism 100 that is attachable to power drill 10. Specifically, drive mechanism 100 includes a drive shaft 110 that is sized and shaped for insertion into chuck 12 of power drill 10, at which point, chuck 12 may be tightened onto drive shaft 110. The drive mechanism 100 may also include a torsion bar $300_{A-C}$ for stabilizing the drive mechanism 100 to the power drill 10. Specifically, torsion bar $300_{A-C}$ includes an elongate portion 310 and an engaging portion $320_{A-B}$. In the embodiment of FIG. 1, engaging portion $320_A$ is hook-shaped, and in the embodiment of FIG. 2, engaging portion $320_B$ is fork-shaped, though other configurations are contemplated. Elongate portion 310 of torsion bar $300_{A-C}$ may be slidably inserted into an aperture of drive mechanism 100 and adjusted to that the engaging portion $320_{A-B}$ abuts the handle 14 of the power drill. The elongate portion 310 of torsion bar $300_{A-C}$ is then held into place by tightening tension knob 150. Alternatively, as shown in FIG. 15, the elongate portion of torsion bar $300_C$ may include one or more ribs. Correspondingly, the drive mechanism 100 may include a ball detent adapted to selectively secure the torsion bar $300_C$ at a plurality of locations along the length of the ribbed elongate portion 310 of the torsion bar $300_C$.

Figure 3:
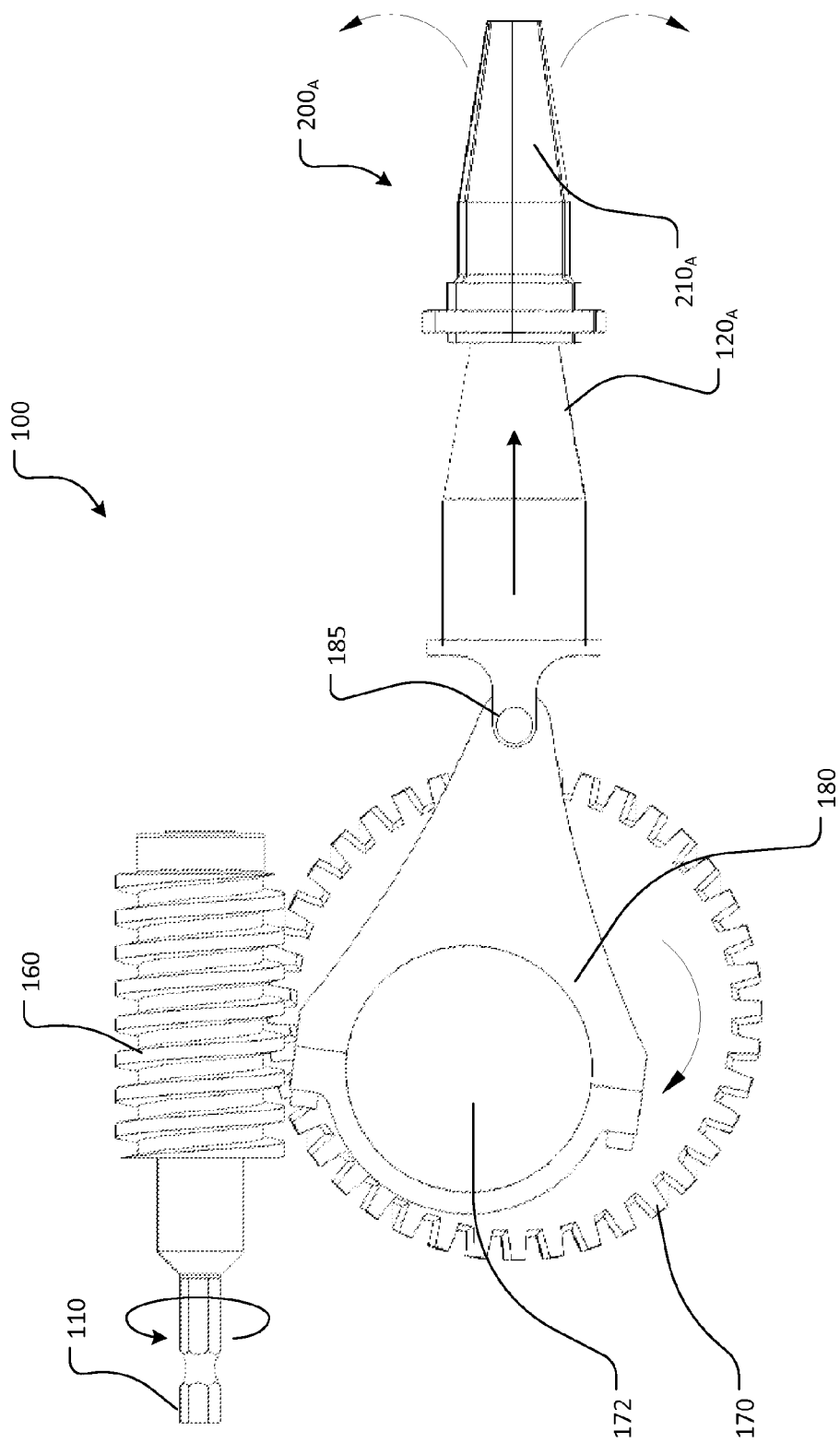
FIG. 3 illustrates a drive mechanism with cover removed and having a crank-slide transmission, in accordance with an embodiment of the present invention.

Drive mechanism 100 also includes a reciprocating drive member $120_{A-B}$. During operation, activation of power drill 10 causes rotation of drive shaft 110. In response to rotation of the drive shaft, a transmission within drive mechanism 100 causes drive member $120_{A-B}$ to reciprocate. It should be appreciated that this may be achieved in a number of ways. For example, FIG. 3 illustrates drive mechanism 100 with cover 140 removed and having a first form of crank-slide transmission, in accordance with an embodiment. The illustrated transmission includes a worm 160 coupled with the drive shaft 110 and adapted to rotate in response to rotation of the drive shaft 110. The transmission also includes a worm gear 170 coupled with the worm 160 in such a way that rotation of the worm 160 causes rotation of the worm gear 170. Along a side of worm gear 170 and off its center lies a hub 172, to which a connecting rod 180 is connected. Connecting rod 180 is also connected to drive member $120_{A-B}$ at pivot point 185. In this configuration, rotation of worm gear 170 is translated into reciprocating, longitudinal movement of drive member $120_{A-B}$. For example, in the illustrated embodiment, counter-clockwise rotation of drive shaft 110 causes clockwise rotation of worm gear 170. As hub 172 moves from the 9 o'clock position to the 3 o'clock position, connecting rod 180 pushes drive member $120_{A-B}$ away from worm gear 170. Then, as hub 172 passes the 3 o'clock position, connecting rod 180 begins to pull drive member 120 back towards worm gear 170.

Figure 4:
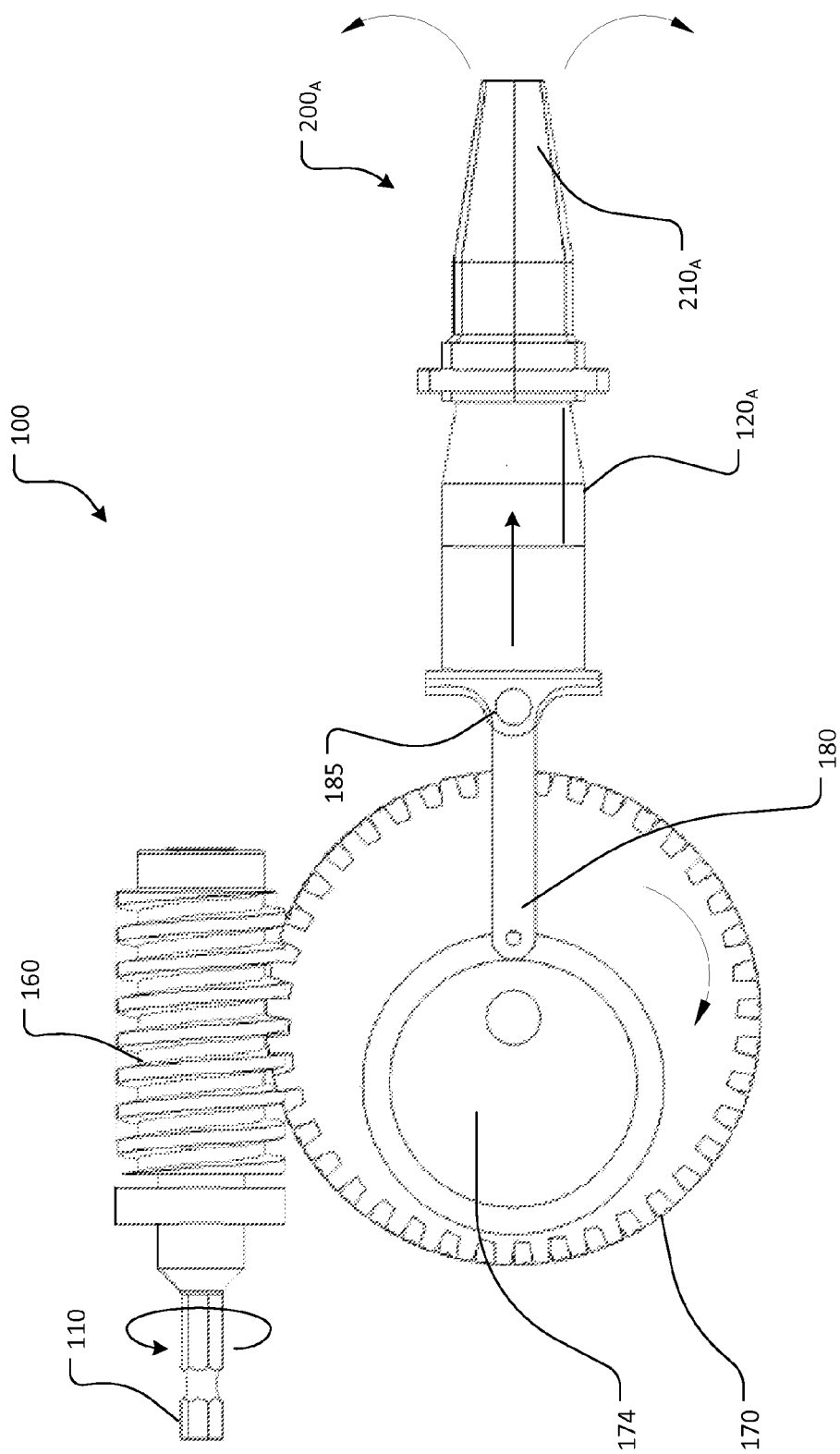
FIG. 4 illustrates an alternative embodiment of a transmission for a drive mechanism, in accordance with an embodiment of the present invention.

FIG. 4 illustrates an alternative embodiment of a second form of a crank-slide transmission for drive mechanism 100. The illustrated transmission likewise includes a worm gear 170 coupled with the worm 160 in such a way that rotation of the worm 160 causes rotation of the worm gear 170. The transmission further includes a cam 174 that rotates in response to rotation of the worm gear 170, and a connecting rod 180 in mechanical communication therewith. Connecting rod 180 is similarly connected to drive member $120_{A-B}$ at pivot point 185. In this configuration, rotation of worm gear 170 is again translated into reciprocating, longitudinal movement of drive member $120_{A-B}$. For example, in the illustrated embodiment, counter-clockwise rotation of drive shaft 110 causes clockwise rotation of worm gear 170. As cam 174 moves from the 9 o'clock position to the 3 o'clock position, connecting rod 180 pushes drive member $120_{A-B}$ away from worm gear 170. Then, as cam 174 passes the 3 o'clock position, connecting rod 180 begins to pull drive member $120_{A-B}$ back towards worm gear 170.

With reference again to FIGS. 1 and 2, systems according to various embodiments may also include one or more interchangeable attachments $200_{A-C}$, such as tubing expander $200_A$, that may be selectively connected to drive mechanism 100 at connector $145_{A-B}$. As described below, the interchangeable attachment $200_{A-C}$ may be connected to drive mechanism 100 in a variety of ways and, moreover, may mechanically communicate with drive mechanism 100 in a variety of ways. While the embodiments illustrated in FIGS. 1 and 2 show the interchangeable attachment $200_{A-C}$ as a tubing expander $200_A$, other interchangeable attachments are contemplated that perform a variety of other functions, including but not limited to a crimper $200_B$, a cutter $200_C$ (including shears, nibblers, rotary cutters, and the like), and a wire tying device. Further, it should be appreciated that the interchangeable attachment $200_{A-C}$ may be used for a variety of applications (e.g. HVAC, plumbing, electrical, construction) and on a variety of materials (e.g. plastic tubing, metal tubing/piping, sheet metal, electrical wire, drywall).

Figure 5:
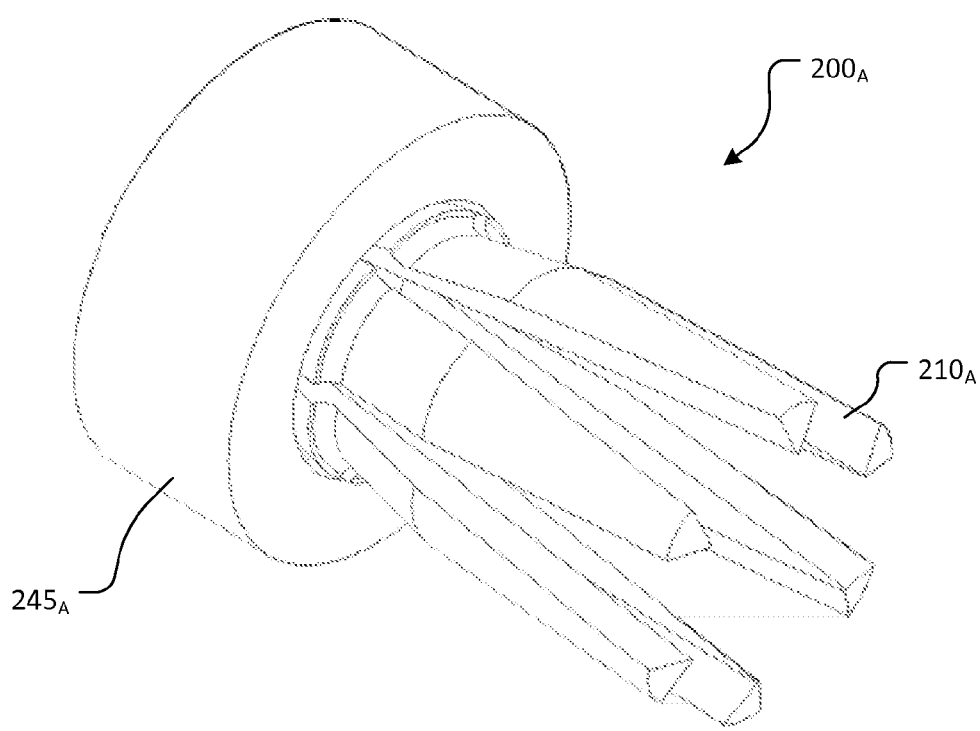
FIG. 5 shows an interchangeable expander attachment in the open position, in accordance with an embodiment of the present invention.

While FIGS. 1 and 2 show expander $200_A$ in the closed position, FIG. 5 shows expander $200_A$ in the open position. As shown, expander $200_A$ includes a plurality of expandable "jaws" $210_A$ which, when closed, may be inserted into a tube. As the jaws $210_A$ are forced open, they press against the inner wall of the tube, causing the tube to expand. Expander $200_A$ may also include a collar $245_{A-B}$ for attaching expander $200_A$ to drive mechanism 100.

Figure 6:
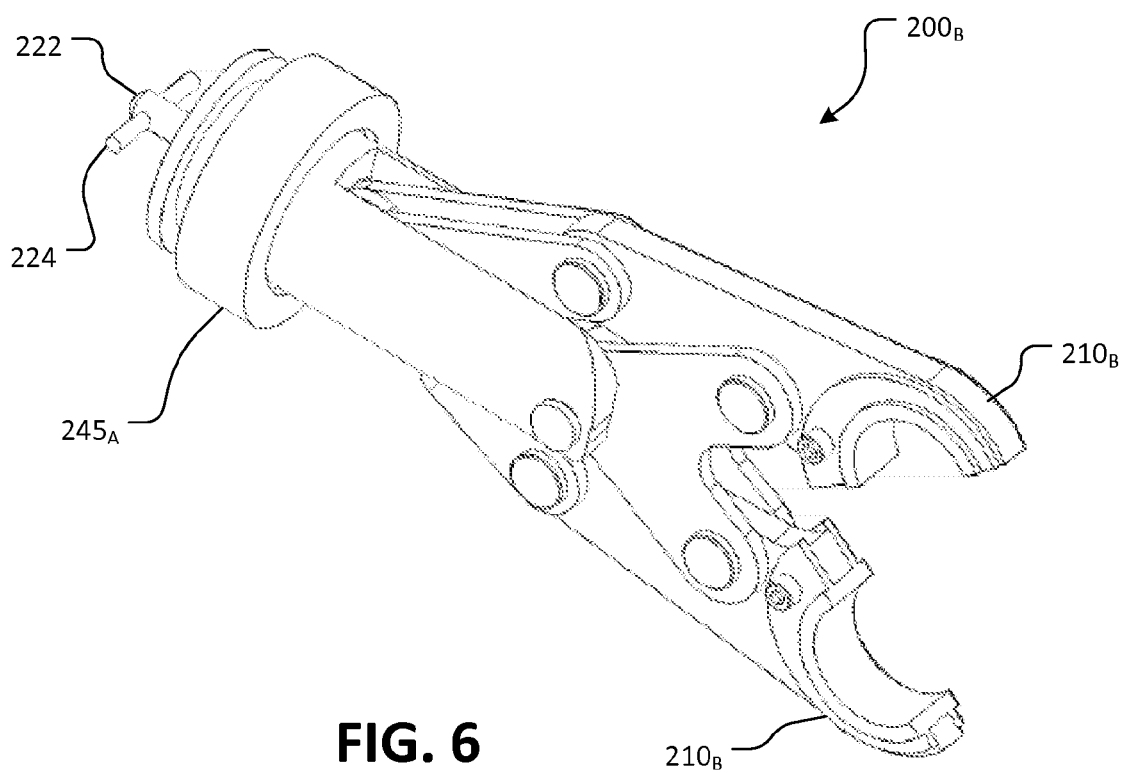
FIG. 6 illustrates an interchangeable crimper attachment, in accordance with an embodiment of the present invention.

FIG. 6 illustrates an interchangeable crimper attachment $200_B$, in accordance with an embodiment of the present invention. Crimper $200_B$ includes a pair of crimping jaws $210_B$—one or both of which may be movable. Crimper $200_B$ also includes a shaft 222 through which a pin 224 passes. In response to the shaft 222 being longitudinally moved towards the jaws $210_B$, the jaws $210_B$ close, and vice versa. Crimper $200_B$ may also include a collar $245_{A-B}$ for attaching crimper $200_B$ to drive mechanism 100.

Figure 7:
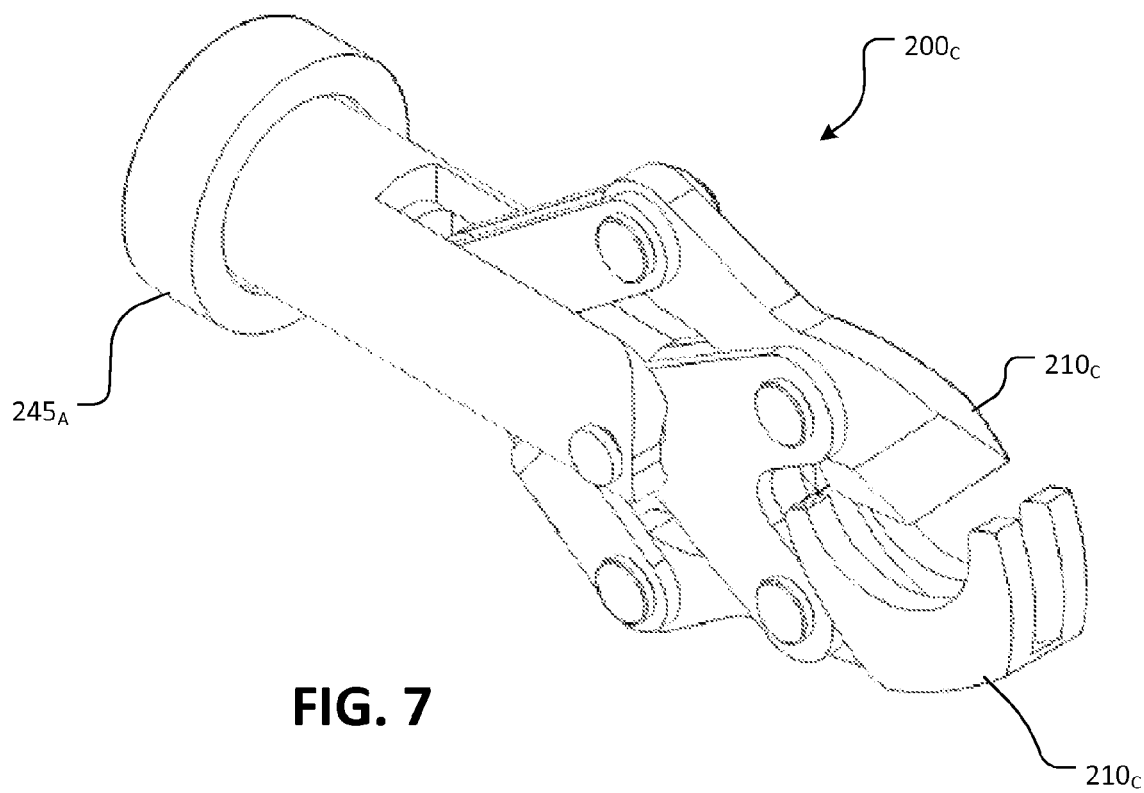
FIG. 7 illustrates an interchangeable cutter attachment, in accordance with an embodiment of the present invention.

FIG. 7 illustrates an interchangeable cutter attachment $200_C$, in accordance with an embodiment of the present invention. Cutter $200_C$ includes a pair of cutting jaws $210_C$—one or both of which may be movable and may comprise a blade. Although not shown in FIG. 7, cutter $200_C$ also includes a shaft 222 through which a pin 224 passes—similar to crimper $200_B$. In response to the shaft 222 being longitudinally moved towards the jaws $210_C$, the jaws $210_B$ close, and vice versa. Cutter $200_C$ may also include a collar $245_{A-B}$ for attaching cutter $200_C$ to drive mechanism 100.

As mentioned above, the interchangeable attachment $200_{A-C}$ may be connected to the drive mechanism 100 in a variety of ways. As shown in FIG. 1, drive mechanism 100 may include a threaded connector $145_A$ over which collar $245_A$ of interchangeable attachment $200_{A-C}$ may be fastened. In that regard, collar $245_A$ may also be threaded. It should be appreciated that connector $145_A$ and collar $245_A$ may each have a single start thread, or multiple start threads.

Figure 8:
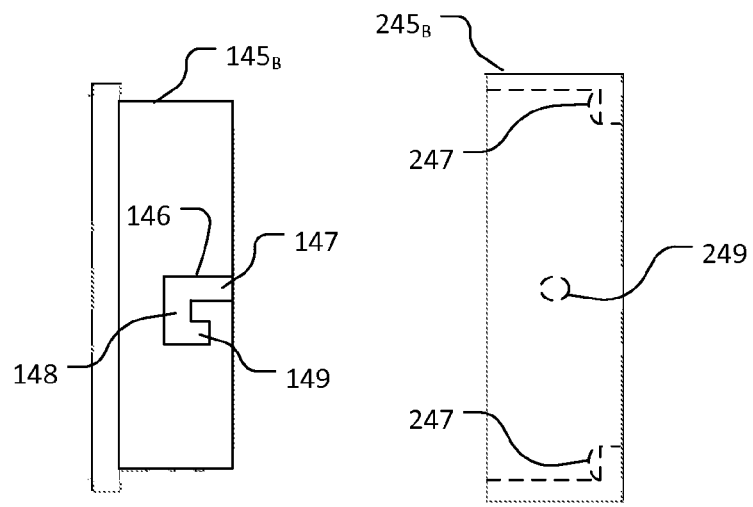
FIG. 8 illustrates a quick-connect type connection between a drive mechanism and an interchangeable attachment, in accordance with an embodiment of the present invention.

Alternatively, the connection between drive mechanism 100 and interchangeable attachment $200_{A-C}$ may involve a "quick connect" design. For example, FIG. 8 illustrates an embodiment of one such connection between drive mechanism 100 and interchangeable attachment $200_{A-C}$. For simplicity, all that has been shown are alternative connector $145_B$ of the drive mechanism 100 and alternative collar $245_B$ of the interchangeable attachment $200_{A-C}$. Connector $145_B$ includes a generally L-shaped channel 146 that in turn includes a first sub-channel 147 that is generally parallel to the direction of the reciprocating motion of the drive member $120_{A-B}$ and a second sub-channel 148 that is generally perpendicular to the direction of the reciprocating motion of the drive member $120_{A-B}$. The second sub-channel 148 further includes a retaining pocket 149 at the end distal to the first sub-channel. The connector $145_B$ preferably includes two or more such L-shaped channels 147.

Correspondingly, collar $245_B$ includes one or more pins 249 disposed along its inner wall and extending radially inward at locations corresponding to the locations of the L-shaped channels 146 of connector $145_B$. Collar $245_B$ also includes one or more resilient members 247, such as a spring or a rubber gasket.

As collar $245_B$ is fit over connector $145_B$, pin 249 slides through the length of the first sub-channel 147 of the L-shaped channel 146 and into the second sub-channel 148. Collar $245_B$ may then be rotated, causing pin 249 to pass through second sub-channel 148 and into retaining pocket 149. At that point, the opposing force created by the resilient member 247 pressing against the outer rim of connector $145_B$ biases the pin 249 into retaining pocket 149. Consequently, the retaining pocket 149 selectively holds pin 249, and thus collar $245_B$ and interchangeable attachment $200_{A-C}$, in place.

In addition to various ways of physically connecting the drive mechanism 100 to the interchangeable attachments $200_{A-C}$, various manners of achieving the mechanical interface between drive member $120_{A-B}$ and the interchangeable attachment $200_{A-C}$ are also contemplated. Referring again to FIG. 1, when drive mechanism 100 is connected to the interchangeable attachment $200_{A-C}$, the drive member $120_{A-B}$ is configured to contact a movable member of the interchangeable attachment $200_{A-C}$ and thereby activate the functionality of the interchangeable attachment $200_{A-C}$. It should be appreciated that this interface may be achieved in a number of ways. For example, in the illustrated embodiment, drive member $120_A$ has a conical shape that generally matches in the inner dimensions of expander $200_A$. Thus, when drive mechanism 100 pushes drive member $120_A$ outward, drive member $120_A$ forces jaws $210_A$ of expander $200_A$ open.

The same conically shaped drive member $120_A$ may also be used with other interchangeable attachments, such as crimper $200_B$ and cutter $200_C$. To that purpose, drive member $120_{A-B}$ may include a slot 122 configured to receive a shaft 222 and pin 224. Prior to connecting collar $245_{A-B}$ to connector $145_{A-B}$, shaft 222 and pin 224 are inserted into slot 122. Once pin 224 reaches the base of slot 122, rotation of shaft 222 causes pin 224 to snap into recess 124, thereby securing drive member 120A to shaft 222, so that the two move in tandem. In this regard, shaft 222 and pin 224 collectively work together as a "key." Alternatively, slot 122 and shaft 222 may each be threaded, and the shaft 222 (without the pin 224) may simply be screwed into slot 122.

Figure 9:
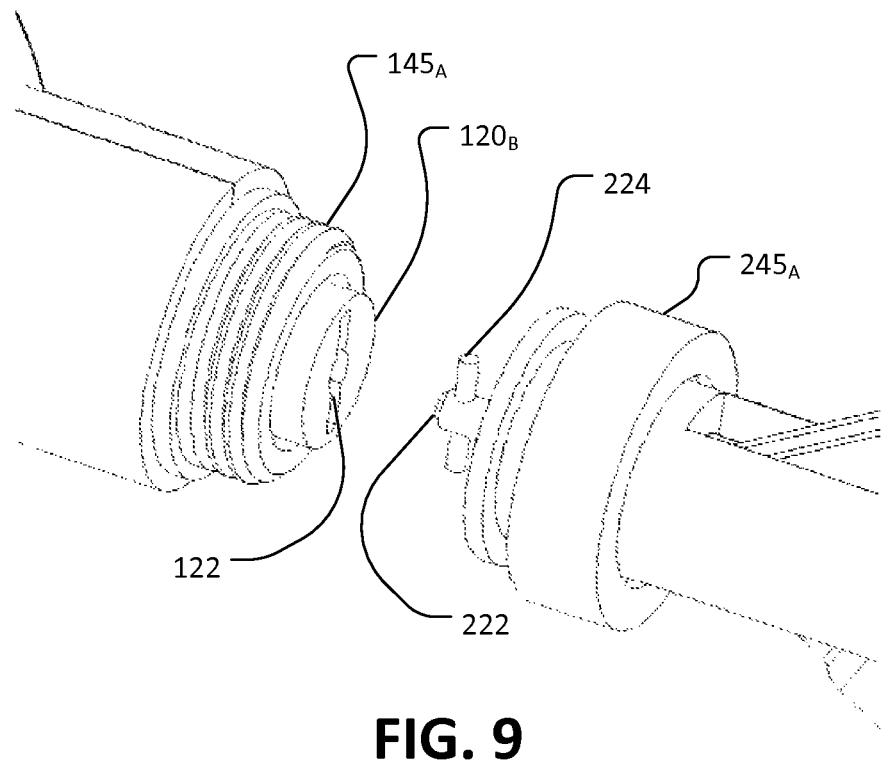
FIG. 9 illustrates a first alternative embodiment of the mechanical interface between a drive member and an interchangeable attachment, in accordance with an embodiment of the present invention.
Figure 10:
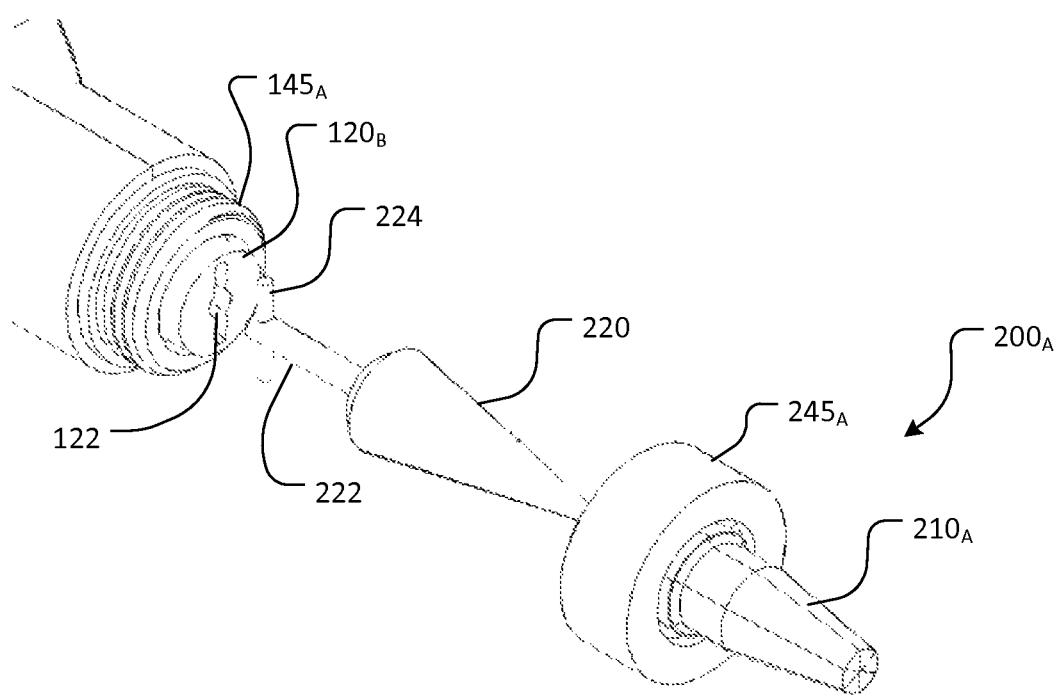
FIG. 10 illustrates the mechanical interface of FIG. 9 together with an interchangeable expander attachment, in accordance with an embodiment of the present invention t.

FIG. 9 illustrates an alternative embodiment of the mechanical interface between the drive member 120B and the interchangeable attachment $200_{A-C}$ in which the drive member $120_B$ is cylindrical, rather than conical. As with drive member $120_A$, drive member $120_B$ includes a slot 122 for receiving the "key" formed by shaft 222 and pin 224 of interchangeable attachment $200_{A-C}$. Slot 122 also includes a recess (not shown) for receiving pin 224 and securing drive member $120_B$ to shaft 222, so that the two move in tandem. FIG. 10 illustrates the mechanical interface of FIG. 9 in the special case involving expander $200_A$. In order to have the best control over the opening and closing of jaws $210_A$, jaws $210_A$ are preferably pushed open with a conical member 220, which is secured to drive member $120_B$ by inserting shaft 222 and pin 224 into slot 122 and rotating them.

Figure 11:
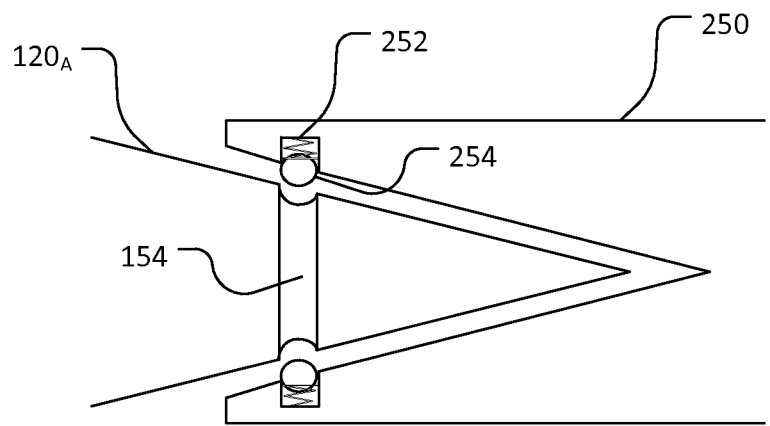
FIG. 11 illustrates a second alternative embodiment of the mechanical interface between a drive mechanism and an interchangeable attachment, in accordance with an embodiment of the present invention.

FIG. 11 illustrates another alternative embodiment of the mechanical interface between drive mechanism 100 and interchangeable attachment $200_{A-C}$. As shown, the drive member $120_{A-B}$ includes a circumferential groove 154, and the movable member 250 of the interchangeable attachment $200_{A-C}$ includes one or more ball detents, each comprising a ball bearing 254 and a spring 252. In this configuration, movable member 250 snaps into place when ball bearings 254 are pushed into groove 154 by the bias from springs 252.

Figure 12:
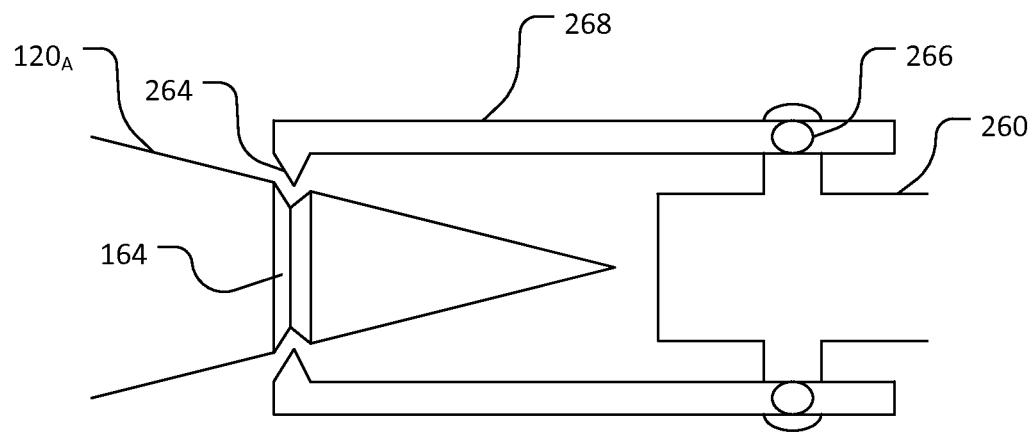
FIG. 12 illustrates a third alternative embodiment of the mechanical interface between a drive mechanism and an interchangeable attachment, in accordance with an embodiment of the present invention.

FIG. 12 illustrates another alternative embodiment of the mechanical interface between drive mechanism 100 and interchangeable attachment $200_{A-C}$. As shown, the drive member $120_{A-B}$ includes a circumferential groove 164, and the movable member 260 of the interchangeable attachment $200_{A-C}$ includes one or more spring arms 268 that move about spring pivots 266. In this configuration, movable member 260 snaps into place when the protrusions 264 of spring arms 268 are pushed into groove 164 by the bias from spring pivots 266.

Figure 13:
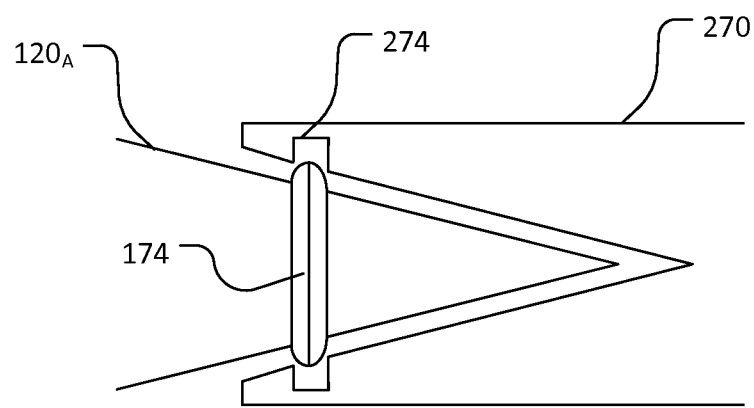
FIG. 13 illustrates a fourth alternative embodiment of the mechanical interface between a drive mechanism and an interchangeable attachment, in accordance with an embodiment of the present invention.

FIG. 13 illustrates another alternative embodiment of the mechanical interface between drive mechanism 100 and interchangeable attachment $200_{A-C}$. As shown, the drive member $120_{A-B}$ includes an expansion ring 174 that contracts when a radial force is applied to it, and the movable member 270 of the interchangeable attachment $200_{A-C}$ includes one or more recesses 274. In this configuration, movable member 270 snaps into place when expansion ring 174 is pushed into recesses 274.

Figure 14:
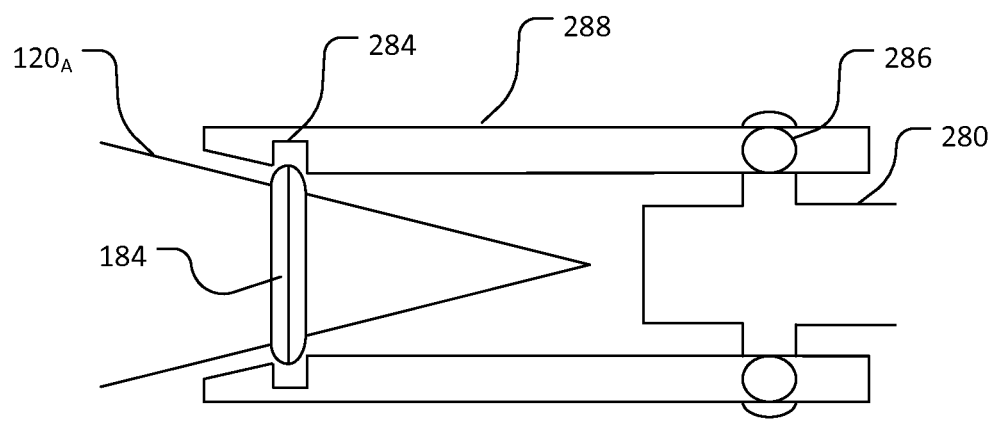
FIG. 14 illustrates a fifth alternative embodiment of the mechanical interface between a drive mechanism and an interchangeable attachment, in accordance with an embodiment of the present invention.

FIG. 14 illustrates another alternative embodiment of the mechanical interface between drive mechanism 100 and interchangeable attachment $200_{A-C}$. As shown, the drive member $120_{A-B}$ includes an outwardly protruding ring 184, and the movable member 280 of the interchangeable attachment $200_{A-C}$ includes one or more spring arms 288 that move about spring pivots 286. In this configuration, movable member 280 snaps into place when the recesses 284 of spring arms 288 are pushed onto ring 184 by the bias from spring pivots 286.

While drive members $120_{A-B}$ have been shown and described herein as being conical or cylindrical in shape, it should be appreciated that other shapes and designs are contemplated herein.

Thus, embodiments provide for a multi-tool transmission and corresponding interchangeable attachments for a rotary tool. As a result of embodiments of the present invention, a worker need only carry a single rotary tool, such as a power drill, to address multiple diverse applications. Moreover, by using a universal transmission, a worker only needs a single transmission for use with many, smaller functional attachments, thereby saving significant expense over purchasing multiple separate attachments that each have an expensive, self-contained transmission.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A drive mechanism for translating rotational output from a rotatable member of a rotary tool to an interchangeable attachment having a movable member, the drive mechanism comprising:
   a rotatable drive shaft sized and shaped for insertion into the movable member of the rotary tool;
   a connector adapted to selectively secure the drive mechanism to the interchangeable attachment;

a reciprocating drive member adapted to contact the movable member of the interchangeable attachment and to cause the movable member to move, when the interchangeable attachment is secured to the drive mechanism; and a transmission configured to translate rotation of the drive shaft into reciprocating motion of the drive member;

wherein the drive member includes a slot formed therein and the slot is sized and shaped to receive a key member of the interchangeable attachment and to longitudinally secure the key member directly to the drive member when the key member is inserted into the slot and rotated whereby the reciprocating motion of the drive member is transmitted to the key member to drive the movable member in a reciprocating manner.

2. The drive mechanism recited in claim 1, wherein the transmission comprises: a worm coupled with the drive shaft and adapted to rotate in response to rotation of the drive shaft; and a worm gear coupled with the worm and adapted to rotate in response to rotation of the worm.

3. The drive mechanism recited in claim 2, wherein the transmission further comprises a crank-slide mechanism that transforms rotational motion of the worm gear into generally linear, reciprocating motion of the drive member.

4. The drive mechanism recited in claim 3, wherein the crank-slide mechanism comprises: a hub disposed on a side of the worm gear and off-center of the worm gear; and a connecting rod coupled between the hub and the drive member.

5. The drive mechanism recited in claim 3, wherein the crank-slide mechanism comprises: a cam that rotates in response to rotation of the worm gear; and a connecting rod in mechanical communication with the cam and coupled with the drive member, wherein the connecting rod causes generally linear, reciprocating motion of the drive member responsive to rotation of the cam.

6. A system for translating rotational output from a rotating member of a rotary tool, the rotary tool having a handle, the system comprising:

an interchangeable attachment having a movable member, the interchangeable attachment selected from the group consisting of an expander, a crimper and a cutter; and a drive mechanism configured to be selectively coupled with the rotary drill and the interchangeable attachment, the drive mechanism comprising:

a rotatable drive shaft sized and shaped for insertion into the rotating member of the rotary tool;

a connector adapted to selectively secure the drive mechanism to the interchangeable attachment;

a reciprocating drive member adapted to contact the movable member of the interchangeable attachment and to cause the movable member to move, when the interchangeable attachment is secured to the drive mechanism; and a transmission configured to translate rotation of the drive shaft into reciprocating motion of the drive member; and a torsion bar having an elongate portion adapted to be slidably mounted to the drive mechanism and an engaging portion which, when the drive mechanism is coupled to the rotary tool, is adapted to abut a portion of the handle of the rotary tool and to stabilize the drive mechanism;

wherein the elongate portion of the torsion bar is ribbed and the drive mechanism comprises a ball detent adapted to selectively secure the torsion bar at a plurality of locations along the length of the ribbed elongate portion of the torsion bar.

7. A drive mechanism for translating rotational output from a rotatable member of a rotary tool to an interchangeable attachment having a movable member, the drive mechanism comprising:

a rotatable drive shaft sized and shaped for insertion into the movable member of the rotary tool;

a connector adapted to selectively secure the drive mechanism to the interchangeable attachment;

a reciprocating drive member adapted to contact the movable member of the interchangeable attachment and to cause the movable member to move, when the interchangeable attachment is secured to the drive mechanism; and a transmission configured to translate rotation of the drive shaft into reciprocating motion of the drive member;

wherein the connector includes a generally L-shaped channel having a first sub-channel that is generally parallel to the direction of the reciprocating motion of the drive member and a second sub-channel that is generally perpendicular to the direction of the reciprocating motion of the drive member, the second sub-channel including a retaining pocket disposed at an end of the second sub-channel that is distal to the first sub-channel, and wherein channel is adapted to have inserted therein a pin of the interchangeable attachment such that the pin is selectively held in place by the retaining pocket.

8. The drive mechanism recited in claim 7, wherein the transmission comprises: a worm coupled with the drive shaft and adapted to rotate in response to rotation of the drive shaft; and a worm gear coupled with the worm and adapted to rotate in response to rotation of the worm.

9. The drive mechanism recited in claim 8, wherein the transmission further comprises a crank-slide mechanism that transforms rotational motion of the worm gear into generally linear, reciprocating motion of the drive member.

10. The drive mechanism recited in claim 9, wherein the crank-slide mechanism comprises: a hub disposed on a side of the worm gear and off-center of the worm gear; and a connecting rod coupled between the hub and the drive member.

11. A drive mechanism for translating rotational output from a rotatable member of a rotary tool to an interchangeable attachment having a movable member, the drive mechanism comprising:

a rotatable drive shaft sized and shaped for insertion into the movable member of the rotary tool;

a connector adapted to selectively secure the drive mechanism to the interchangeable attachment;

a reciprocating drive member adapted to contact the movable member of the interchangeable attachment and to cause the movable member to move, when the interchangeable attachment is secured to the drive mechanism; and a transmission configured to translate rotation of the drive shaft into reciprocating motion of the drive member;

wherein the drive member includes a threaded bore adapted to receive a threaded shaft of the interchangeable attachment and the threaded bore is adapted to longitudinally secure the threaded shaft directly to the drive member whereby the reciprocating motion of the drive member is transmitted to the threaded shaft.

12. The drive mechanism recited in claim 11, wherein the transmission comprises: a worm coupled with the drive shaft and adapted to rotate in response to rotation of the drive shaft;

and a worm gear coupled with the worm and adapted to rotate in response to rotation of the worm.

13. The drive mechanism recited in claim 12, wherein the transmission further comprises a crank-slide mechanism that transforms rotational motion of the worm gear into generally linear, reciprocating motion of the drive member.

14. The drive mechanism recited in claim 13, wherein the crank-slide mechanism comprises: a hub disposed on a side of the worm gear and off-center of the worm gear; and a connecting rod coupled between the hub and the drive member.

15. A drive mechanism for translating rotational output from a rotatable member of a rotary tool to an interchangeable attachment having a movable member, the drive mechanism comprising:
- a rotatable drive shaft sized and shaped for insertion into the movable member of the rotary tool;
- a connector adapted to selectively secure the drive mechanism to the interchangeable attachment;
- a reciprocating drive member adapted to contact the movable member of the interchangeable attachment and to cause the movable member to move, when the interchangeable attachment is secured to the drive mechanism; and
- a transmission configured to translate rotation of the drive shaft into reciprocating motion of the drive member;
- wherein the drive member of the drive mechanism includes a recess adapted to mate with a protrusion of a drive member of the interchangeable attachment, wherein the recess and the protrusion cooperate to longitudinally secure the drive member of the drive mechanism to the drive member of the interchangeable attachment, wherein the reciprocating motion of the drive member of the drive mechanism is transmitted to the drive member of the interchangeable attachment.

16. The drive mechanism recited in claim 15, wherein the transmission comprises: a worm coupled with the drive shaft and adapted to rotate in response to rotation of the drive shaft; and a worm gear coupled with the worm and adapted to rotate in response to rotation of the worm.

17. The drive mechanism recited in claim 16, wherein the transmission further comprises a crank-slide mechanism that transforms rotational motion of the worm gear into generally linear, reciprocating motion of the drive member.

18. The drive mechanism recited in claim 17, wherein the crank-slide mechanism comprises: a hub disposed on a side of the worm gear and off-center of the worm gear; and a connecting rod coupled between the hub and the drive member.

* * * * *